Patented Aug. 15, 1950

2,519,112

UNITED STATES PATENT OFFICE 2,519,112

PENICILLIN SALTS OF AMINOACID ESTERS OF STEROLS AND PREPARATION THEREOF

Robert D. Coghill, Lake Bluff, Arthur W. Weston, Waukegan, and Donald W. MacCorquodale, Highland Park, Ill., assignors to Abbott Laboratories, North Chicago, Ill., a corporation of Illinois No Drawing. Application February 20, 1947, Serial No. 729,888

14 Claims. (Cl. 260—239.5)

1

This invention relates in general to organic salts of antibiotic compounds and specifically to insoluble salts of high molecular weight basic esters of amino carboxylic acids and acidic antibiotic compounds.

The object of this invention is to provide difficulty soluble compounds of antibiotics, such as the penicillins, which upon administration into the body will maintain therapeutically effective concentrations in the blood stream for a longer period of time than the preparations of the prior art. The penicillins are found to be eliminated from the body in varying degrees of rapidity, but in all cases the duration of action of the compound is for a relatively short period of time. This period is usually limited to several hours. This means that when penicillin is administered by intravenous injection, the patient must usually be hospitalized so as to be available for the penicillin therapy. In the case of intramuscular injection, the Romansky formula using calcium penicillin has been successful in prolonging blood levels in therapeutically effective concentrations for a maximum of about six hours in dogs. For the purpose of comparison, when the compounds of this invention are incorporated into a wax-oil medium and injected into dogs, we have discovered that therapeutically effective blood levels are maintained in the order of 16 to 20 hours or more. Therefore, when administered in this manner, therapeutic levels may be maintained for the period of nearly a day with a single injection. In the case of human beings this period may extend for several days.

The explanation of this phenomenon apparently rests in the fact that since the penicillin salts of this invention are insoluble in the fluids of the body, the penicillin is released slowly by hydrolysis in the body, thus becoming available for absorption into the blood stream in gradual amounts. Thus the dose of the penicillin is not dissipated due to rapid elimination from the body.

The compounds of this invention are salts of high-molecular weight esters, such as the sterol esters of amino organic acids, and acidic antibiotics. These compounds are represented by the following structure:

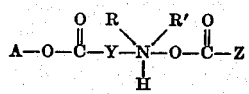

wherein A is a high-molecular weight radical such as a sterol residue, Y is an aliphatic residue containing from 1 to 11 carbon atoms, R and R' are hydrogen or a lower alkyl group, and Z is an antibiotic residue such as that of a penicillin.

A general preparation of these compounds may be accomplished in the following manner: A high molecular weight hydroxy compound, such as a sterol, or high aliphatic alcohol, is reacted with a haloacyl halide. The haloester formed is then reacted with an amine to form the aminoester. The aminoester, which is a base, may be reacted with an acid to form the salt for isolation purposes. The free base (amine) dissolved in a solvent such as ether, and a solution of the acidic form of the antibiotic are mixed, and upon standing and cooling, the salt of the amine base and the antibiotic crystallizes from the solution.

This synthesis may be described by the following series of equations:

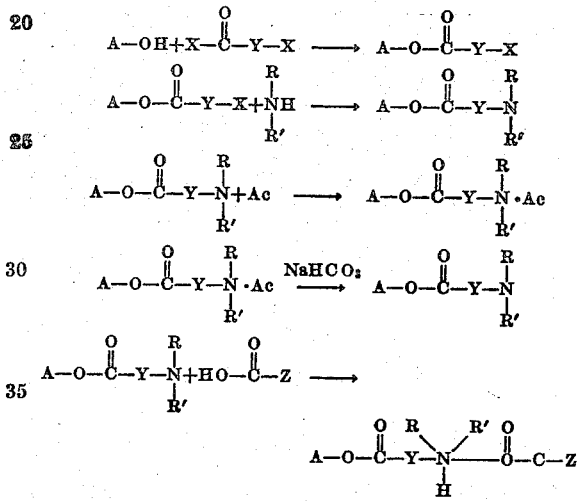

The symbols used have the same meaning as given above. In addition, X is a halogen atom such as chlorine, bromine, and iodine and Ac is an acid.

The process as given above describes the general synthesis of this invention. The examples that follow will relate to specific examples of the invention for the purpose of illustration.

EXAMPLE I

*Cholesteryl chloroacetate*

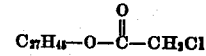

A mixture of 38.5 gms. of cholesterol and 11.3 gms. of chloroacetyl chloride in 100 cc. of dry toluene is refluxed for five hours, then cooled and the solid removed by filtration. A good yield of the product, cholesteryl chloroacetate, melting at 161–163° C., is obtained.

Using bromoacetyl chloride, chloroacetyl bromide or bromoacetyl bromide the products obtained are cholesteryl bromoacetate, cholesteryl chloroacetate and cholesteryl bromoacetate, respectively. When iodacetyl chloride, bromide, and iodide are used, the product is cholesteryl iodoacetate.

Instead of using acetyl as the acyl group in the example above, other acyl groups may be used. For example, the halo-propionyl, -butyryl, -valeryl, -caproyl, -enanthylyl, -caprylyl, -pelargonyl, -capryl, -undecylyl or -laurylyl halides may be used. In which case, the compounds produced are cholesterylhalo-propionate, -butyrate, -valerate, -caproate, -enanthylate, -caprylate, -pelargonate, -caprate, -undecylate, and -laurate, respectively. The halogen may also be situated on any carbon of the alkyl chain and the chain itself may be straight or branched.

As examples of the branched chain haloacyl halides which may be used are the α-haloisobutyric acid and the β-halobutyric acid. The compounds produced with these acid halides are cholesteryl-α-haloisobutyrate and cholesteryl-β-haloisobutyrate.

In a straight chain halo acyl halide, such as halopropionyl halide, the halogen on the alkyl chain may be either in the alpha or beta position. In the former case, the compound formed is cholesteryl α-halopropionate and in the latter case, the compound formed is cholesteryl-β-halopropionate.

The cholesterol used in the example may be replaced by other high molecular weight alcohols such as stigmasterol, sitosterol, phytosterol, ergosterol, calciferol, lumisterol, cetyl, ceryl, myricyl, and octadecyl alcohols.

The esterification in this example may be accomplished by other means than that described above. For example, the alcohol may be converted to the halide and the halide reacted with the metallic salt of the haloorganic acid. This may be illustrated by the following reactions where A, X, and Y are as represented above and M represents a metal such as sodium:

$$AOH \xrightarrow{PBr_3 \text{ or } P+I_2} ABr \text{ or } AI$$

$$ABr + MO\overset{O}{\underset{}{C}}-Y-W \longrightarrow R-O-\overset{O}{\underset{}{C}}-Y-W$$
or AI wherein W is chlorine or an amine forming group such as a nitro, cyano, formyl, or carboxyl group. The esterification may also be carried out by reacting the alcohol with a haloorganic anhydride as illustrated below:

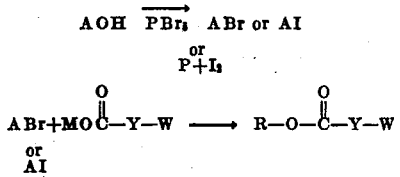

The hydroxy compound may be reacted with the haloorganic acid in the presence of an acid catalyst. The illustration of the reaction is given below:

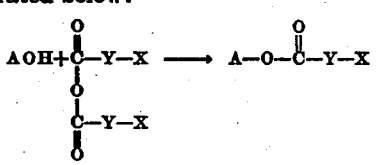

EXAMPLE II

*Cholesteryl diethylaminoacetate hydrochloride*

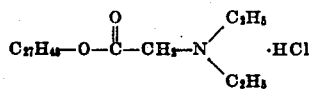

About 17.1 gms. of cholesteryl chloroacetate (Example I) is dissolved in 55 cc. of hot, dry benzene. About 5.4 gms. of diethylamine is added and the solution refluxed for twelve hours. The reaction mixture is washed with water, then dried over anhydrous sodium sulfate. The addition of gaseous hydrogen chloride to the benzene solution precipitates the white, solid hydrochloride salt which is separated by filtration and washed with ether. The yield of product melting at 228–230° C. (with decomposition) is quantitative. By crystallizing from alcohol, pure material melting at 237° C. (with decomposition) is obtained.

In this example the diethylamine may be replaced with other secondary amines such as dimethyl, dipropyl and dibutyl. In the use of these amines the products produced are cholesteryldimethylaminoacetate, dipropylaminoacetate and dibutylaminoacetate hydrochlorides. The alkyl groups of the amine need not be the same and as an example to illustrate this, if methylethylamine is used, the product is cholesteryl methylethylaminoacetate hydrochloride.

Branched alkyl amines may be used as well as straight chain amines. For example, diisopropylamine and ethylisopropylamine may be used. In which case the compounds formed are cholesteryl diisopropylaminoacetate hydrochloride and cholesteryl ethylisopropylamine hydrochloride, respectively.

A primary amine or ammonia may be used instead of a secondary amine in which case the aminoester formed is monoalkylated. For example, if ethyl amine, methyl amine or ammonia are used the compounds formed are cholesteryl ethylaminoacetate, methylaminoacetate and aminoacetate.

Instead of hydrogen chloride being used in the example above, other acids may be used. Some of these acids are hydrobromic, sulfuric, nitric and acetic, which will give the dialkylamine-hydrobromide, -sulfate, -nitrate and -acetate, respectively.

In addition to the process described in Example II, the amino esters may be prepared by reacting the aminoacyl halide acid addition product with a suitable high molecular-weight alcohol. For example, the hydrochloride of diethylaminoacetyl chloride may be reacted with the cholesterol to give cholesteryl diethylaminoacetate hydrochloride as above.

EXAMPLE III

*Cholesteryl diethylaminoacetate*

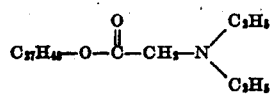

About 5 gms. of cholesteryl diethylaminoacetate hydrochloride (Example II) is stirred vigorously with an excess of a nearly saturated sodium bicarbonate solution and 100 cc. of ether until the solid disappears. The ether layer is then separated, the aqueous layer extracted with ether and the ether solutions combined, dried and concentrated. A residue of 4.6 gms. is obtained which on crystallization from alcohol gives 4.3 gms. or 92% of theoretical yield of product melting at 88–90° C. The pure material melts at 90–91° C.

Other neutralizing agents than sodium bicarbonate may be used to convert the amine acid addition product to the free amine. For example, such alkaline compounds as sodium hydroxide and sodium carbonate may be used. Also other basic products may be used to neutralize the acid adjoining the amine group.

As an alternate process for preparing these aminoesters, the corresponding nitro, cyano, carboxyl, formyl, or other amine forming group-acyl halide may be used for the esterification. When the amine forming group is nitro or cyano it is converted to the amine by the conventional methods of reduction, and when the group is carboxyl or formyl by reacting with an amine followed by reduction.

These amino esters may be prepared by ester exchange. By way of example, cholesteryl diethylaminoacetate may be prepared by reacting cholesterol with the methyl ester of diethylaminoacetic acid. This reaction is illustrated by the following equation:

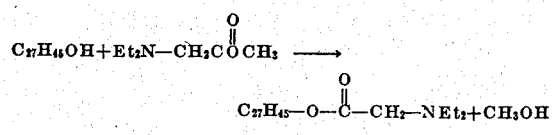

EXAMPLE IV

*Cholesteryl diethylaminoacetate salt of penicillin "G"*

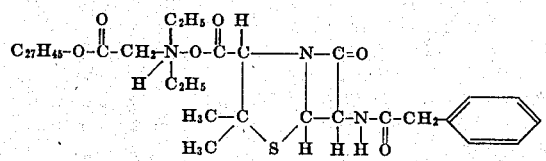

About 4 gms. of pure crystalline sodium salt of penicillin "G" (which has been assigned the chemical name sodium benzylpenicillinate in the forthcoming Official Penicillin Monograph being sponsored by the National Research Council) is dissolved in 20 cc. of distilled water. This aqueous solution is extracted three times with ether, using 20—10—10 cc. volumes at a temperature of less than 5° C., with pH adjusted to 2 by means of a 30% solution of ortho-phosphoric acid. The ether extract containing the penicillin "G" as a free acid is washed with 4 cc. of distilled water and concentrated to 20 cc. volume in a current of nitrogen.

About 5 gms. of the pure cholesteryl diethylaminoacetate base (Example III) is dissolved in 20 cc. of anhydrous ether. To this 20 cc. ether solution of the base, is added slowly the 20 cc. ether solution of the penicillin acid. The solution is stirred and then allowed to stand at room temperature. Crystallization begins shortly. After placing the solution in the refrigerator over night, the crystals are collected by centrifugation or filtration, washed with anhydrous ether and dried, first in a stream of nitrogen and then under vacuum. The yield is 6.79 gms. (75.4%) of snow-white crystals. A second crop of about 1.11 gms. is obtained after concentration of the mother liquors. The material is non-hygroscopic and melts to a colorless liquid at 104–107° C. The compound is almost completely insoluble in water, very slightly soluble in peanut oil and in ether, and very soluble in chloroform.

When analysed by the conventional methods of microchemical analysis the compound is found to contain 70.31% carbon, 8.76% hydrogen and 4.96% nitrogen. These results agree with the calculated percentages for $C_{49}H_{75}O_6N_3S$ which are 70.70% carbon, 9.00% hydrogen, 5.05% nitrogen. Bioassay of the compound (by releasing the penicillin with a buffer solution) indicates 715 Oxford units of penicillin "G" per milligram. The theoretical potency contributed by the penicillin component in this molecule is 710 units per milligram.

In the above example other acid antibiotics may be used instead of penicillin "G." For example, penicillins "F," "X" and "K," the other common penicillins may be used. These penicillins have been given the names of $\Delta^2$-pentenyl-, p-hydroxybenzyl-, and n-heptylpenicillins respectively in the Official Penicillin Monograph. The compounds produced by using these penicillins in forming salts with the cholesteryl diethylaminoacetate are: $\Delta^2$-pentenyl-, p-hydroxybenzyl- and n-heptylpenicillinates of cholesteryl diethylaminoacetate.

EXAMPLE V

*Cholesteryl diethylaminoacetate salt of penicillin "F"*

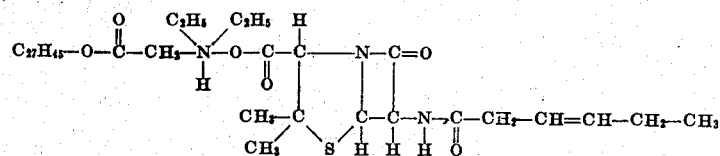

In accordance with the procedures set forth above, the cholesteryl diethylaminoacetate salt of penicillin "F," ($\Delta^2$-pentenylpenicillin) may be prepared by reacting cholesteryldiethylaminoacetate with penicillin "F."

EXAMPLE VI

*Cholesteryl diethylaminoacetate salt of penicillin "X"*

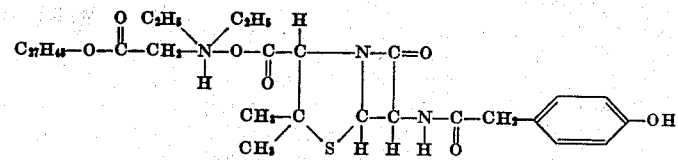

In accordance with the procedures set forth above, the cholesteryl diethylaminoacetate salt of penicillin "X" (p-hydroxybenzylpenicillin) may be prepared by reacting cholesteryldiethylaminoacetate with penicillin "X."

EXAMPLE VII

*Cholesteryl diethylaminoacetate salt of penicillin "K"*

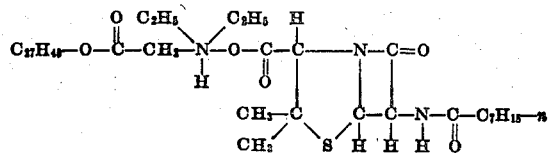

By using the procedure set forth in Example IV using penicillin "K" (n-heptylpenicillin) with the cholesteryl diethylaminoacetate the above compound is produced.

Other of the less common penicillins may be used such as those produced by precursor activity or fermentations of other penicillin producing molds. As examples of those produced by precursor activity which may be used are phenylmercaptomethyl-, p-bromophenylmercaptomethyl-, benzylmercaptomethyl-, phenylethylmercaptomethyl-, and p-hydroxyphenylmercaptomethylpenicillins. These compounds are disclosed in U. S. Patent Application No. 721,146. When these penicillins are used in salt formation with the cholesteryl diethylaminoacetate the products obtained are: phenylmercaptomethylpenicillinate, p-bromophenylmercaptomethylpenicillinate, benzylmercaptomethylpenicillinate, phenylethylmercaptomethylpenicillinate, and p-hydroxyphenylmercaptomethylpenicillinate of cholesteryl diethylaminoacetate. As examples of those penicillins produced naturally by the fermentation of other penicillin molds are gigantic acid which is n-pentylpenicillin (dihydropenicillin "F") and flavicidin which is isomeric with penicillin F (the unsaturation in the pentyl group is in a different position). When used for salt formation with cholesteryl diethylaminoacetate the products obtained are the cholesteryl diethylaminoacetate salt of gigantic acid and the cholesteryl diethylaminoacetate salt of flavicidin.

Other acid antibiotics which may be used instead of the penicillins are: penicillic acid, citrinic acid, and aspergillic acid.

In combination with the penicillins described above other bases may be used such as those described in Example III or bases prepared by the processes of the invention starting with the compounds described in Examples I and II. Included in this group are benzylpenicillinate of cholesteryl dimethylamino-n-propionate; Δ²-pentenylpenicillinate of cholesteryl dipropylaminolaurate; p-hydroxybenzylpenicillinate of cholesteryl dibutylamino-n-butyrate; p-hydroxyphenylmercaptomethylpenicillinate of cholesteryl diethylamino-n-butyrate; benzylmercaptomethylpenicillinate of cholesteryl dimethylaminoacetate; benzylpenicillinate of stigmasteryl diethylaminoacetate; Δ²-pentenylpenicillinate of ergosteryl diethylaminoacetate; benzylpenicillinate of ergosteryl diethylaminoacetate; benzylpenicillinate of cetyl methylethylaminovalerate; n-heptylpenicillinate of cetyl dimethylamino-iso-butyrate; aspergillate of n-octadecyl di-n-propylaminoacetate; p-hydroxyphenylmercaptomethylpenicillinate of n-octadecyl methyl-n-propylaminopropionate; phenyl mercaptomethylpenicillinate of stigmasteryl diethylaminoacetate; n-heptylpenicillinate of stigmasteryl dimethylamino-n-butyrate; p-hydroxybenzylpenicillinate of stigmasteryl dimethylaminocaprate; penicillic acid salt of calciferyl diethylaminolaurate; benzylpenicillinate of calciferyl diethylaminoacetate; Δ²-pentenylpenicillinate of calciferyl diethylaminoacetate; p-hydroxybenzylpenicillinate of calciferyl diethylaminoacetate; n-heptylpenicillinate of calciferyl diethylaminoacetate; benzylpenicillinate of lumisteryl diethylaminoacetate; Δ²-pentenylpenicillinate of lumisteryl diethylaminoacetate; Δ²-pentenylpenicillinate of stigmasteryl diethylaminoacetate; p-hydroxybenzylpenicillinate of stigmasteryl diethylaminoacetate; p-hydroxybenzylpenicillinate of lumisteryl diethylaminoacetate; p-hydroxybenzylpenicillinate of ergosteryl diethylaminoacetate; benzylpenicillinate of cetyl diethylaminoacetate; Δ²-pentenylpenicillinate of cetyl diethylaminoacetate; p-hydroxypenicillinate of cetyl diethylaminoacetate; n-heptylpenicillinate of cetyl diethylaminoacetate; n-heptylpenicillinate of ergosteryl diethylaminoacetate; benzylpenicillinate of octadecyl diethylaminoacetate; Δ²-pentenylpenicillinate of octadecyl diethylaminoacetate; n-heptylpenicillinate of octadecyl diethylaminoacetate; p-hydroxybenzylpenicillinate of octadecyl diethylaminoacetate; benzylpenicillinate of sitosteryl diethylaminoacetate; Δ²-pentenylpenicillinate of sitosteryl diethylaminoacetate; p-hydroxypenicillinate of sitosteryl diethylaminoacetate; n-heptylpenicillinate of sitosteryl diethylaminoacetate; benzylpenicillinate of cholesteryl ethylaminoacetate; Δ²-pentenylpenicillinate of cholesteryl ethylaminoacetate; p-hydroxybenzylpenicillinate of cholesteryl ethylaminoacetate; n-heptylpenicillinate of cholesteryl ethylaminoacetate; n-pentylpenicillinate of cholesteryl ethylaminoacetate; benzylpenicillinate of cerylyl diethylaminoacetate; n-heptylpenicillinate of cerylyl diethylaminoacetate; p-hydroxybenzylpenicillinate of cerylyl diethylaminoacetate; Δ²-pentenylpenicillinate of cerylyl diethylaminoacetate; benzylpenicillinate of myricyl diethylaminoacetate; p-hydroxybenzylpenicillinate of myricyl diethylaminoacetate; n-heptylpenicillinate of myricyl diethylaminoacetate; Δ²-pentenylpenicillinate of myricyl diethylaminoacetate; benzylpenicillinate of cholesteryl aminoacetate; n-heptylpenicillinate of cholesteryl aminoaceate; p-hydroxybenzylpenicillinate of cholesterylaminoacetate; Δ²-pentenylpenicillinate of cholesteryl aminoacetate; benzylpenicillinate of phytosteryl diethylaminoacetate; n-heptylpenicillinate of phytosteryl diethylaminoacetate; p-hydroxybenzylpenicillinate of phytosteryl diethylaminoacetate; Δ²-pentenylpenicillinate of phytosteryl diethylaminoacetate and benzylpenicillinate of phytosteryl ethylaminoacetate.

In addition to the process outlined above these amine base salts of antibiotics may be prepared by reacting the amine acid addition product (Example II) with a salt such as the sodium salt of the antibiotic acid. This process may be illustrated by the following reaction:

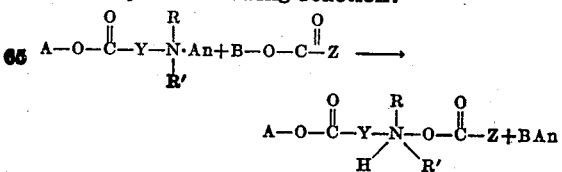

wherein A is a high molecular weight radical, such as a sterol residue, Y is an aliphatic residue containing from 1 to 11 carbon atoms, R and R' are hydrogen or a lower alkyl group, B is a cation, An is an anion, and Z is an antibiotic residue such as that of a penicillin.

Salts of antibiotic compounds according to the invention may be made up into a variety of pharmaceutical vehicles for the administration of these therapeutic compounds. Among the compositions of matter which have been prepared and used successfully are aqueous suspensions, saline suspensions, vegetable oil suspensions, vegetable oil-wax suspensions, and tablets, etc.

Because of the slow liberation of the antibiotic compound into the blood stream, it is possible to maintain a longer duration of a therapeutically significant concentration of the antibiotic by the administration of these pharmaceutical preparations.

As illustrative examples of the preparations referred to above are the following:

EXAMPLE VIII

These insoluble antibiotic salts form aqueous suspensions and may be prepared by adding the desired quantity of the compound to a suitable volume of sterile distilled water or isotonic saline solution.

EXAMPLE IX

Suspensions of the insoluble antibiotic salts of this invention in vegetable oils, such as peanut oil, have been made. For example, by making a saturated solution of the cholesteryl diethylaminoacetate salt of benzylpenicillinate (penicillin "G") (Example IV) in sterile peanut oil at room temperature, a bioassay of the product indicates a potency of 874 Oxford units per cc. Since the potency of this penicillin salt is 715 units per milligram, this indicates a concentration of about 1.22 mg. of material per cc. of oil. The oil has the property of retarding absorption of the compounds of the present invention into the blood stream.

EXAMPLE X

We have discovered that a very successful form for administering these antibiotic salts is by means of a suspension in a wax-vegetable oil medium. This type of preparation has a very prolonged period of action since it combines two insolubilities. Therefore, the antibiotic is made available for absorption into the blood stream in even more graduated amounts. An advantageous method for preparation of this type of pharmaceutical product is to mix a desired amount of the insoluble antibiotic salt with the sterile oil and then molten wax such as beeswax is added. The mixture is allowed to cool while continuing the stirring so as to solidify the mass. Various concentrations of the components of the mixture may be used but usually the concentrations of the insoluble antibiotic salt are fairly high; in the order of 200,000 or 300,000 units of penicillin per cc. of wax-oil mixture. The concentration of the wax may be varied to give the desired physical properties to the mass.

EXAMPLE XI

As a means of oral administration of the antibiotic salts of this invention is the incorporation of therapeutically significant amounts of the medicament into a conventional tablet base and forming tablets by the usual means. These tablets may be provided with enteric coating if desired.

The alkyl groups on the amine preferably contain from one to four carbon atoms.

The term halogen unless specifically defined includes chlorine, bromine, and iodine.

The high-molecular weight alcohols and radicals referred to are intended to contain at least sixteen carbon atoms.

Others may readily adapt the invention for use under varying conditions of service, by employing one or more of the novel features disclosed or equivalents thereof. As at present advised with respect to the apparent scope of our invention, we desire to claim the following subject matter.

We claim:

1. The penicillin salt of a steryl ester of an amino lower fatty acid selected from the group consisting of $NH_2$-alkylene-COOH; lower alkyl·NH-alkylene-COOH; and (lower alkyl)$_2$·N-alkylene COOH, said alkylene group having 1–11 carbon atoms.

2. The penicillin salt of a steryl ester of an amino acetic acid represented by the formula $NH_2CH_2COOH$.

3. The penicillin salt of a steryl ester of a lower-alkylamino acetic acid.

4. The penicillin salt of a steryl ester of a di-lower-alkylamino acetic acid.

5. The penicillin salt of the cholesteryl ester of an amino acetic acid represented by the formula $NH_2CH_2COOH$.

6. The penicillin salt of the cholesteryl ester of a lower-alkylamino acetic acid.

7. The penicillin salt of the cholesteryl ester of a di-lower-alkylamino acetic acid.

8. The penicillin salt of the cholesteryl ester of diethylamino acetic acid.

9. The compound cholesteryl diethylaminoacetate salt of benzyl penicillinate which has the following structure:

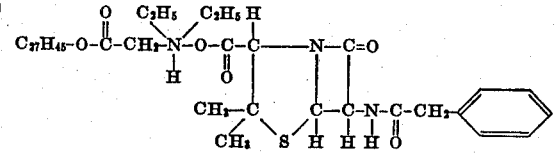

10. The compound cholesteryl diethylaminoacetate salt of $\Delta^2$-pentenylpenicillin which has the following structure:

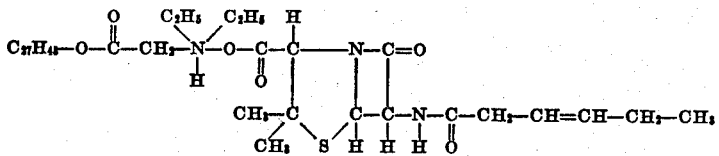

11. The compound cholesteryl diethylaminoacetate salt of p-hydroxybenzylpenicillin which has the following structure:

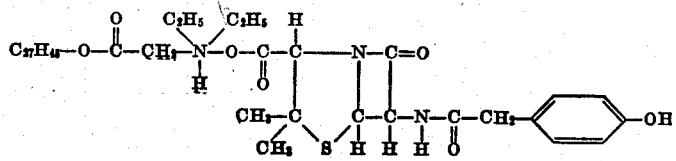

12. The compound cholesteryl diethylaminoacetate salt of n-heptylpenicillin which has the following structure:

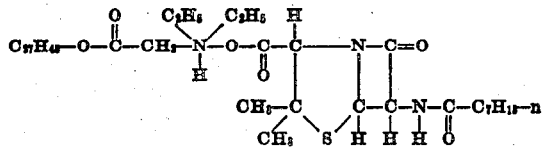

13. The process of preparing a salt of claim 1 which comprises mixing penicillin as the free acid with a steryl ester of the amino lower fatty acid in an inert organic solvent.

14. The process of preparing the salt of claim 9 which comprises mixing penicillin G as the free acid with cholesteryl diethylaminoacetate in ether.

ROBERT D. COGHILL.
ARTHUR W. WESTON.
DONALD W. MacCORQUODALE.

REFERENCES CITED

The following references are of record in the file of this patent:

UNITED STATES PATENTS

| Number | Name | Date |
|---|---|---|
| 2,399,840 | Wachtel | May 7, 1946 |
| 2,409,859 | Horsfall | Oct. 22, 1946 |
| 2,415,719 | Abramson | Feb. 11, 1947 |
| 2,417,773 | Martin et al. | Mar. 18, 1947 |

OTHER REFERENCES

Hobby et al., "Proc. Soc. Exp. Biol. & Med.," June 1942, page 287.

Beyer et al., "Science," vol. 100, Aug. 4, 1944, page 107.

"J. Amer. Med. Assoc.," July 21, 1945, page 910.

Creet et al., "The Pharmaceutical Journal," Sept. 23, 1944, page 124.

Krantz et al., "Science," vol. 101, Jan. 15, 1945, page 518.